United States Patent
Donlin et al.

(10) Patent No.: US 11,610,042 B1
(45) Date of Patent: Mar. 21, 2023

(54) SCALABLE SCRIBE REGIONS FOR IMPLEMENTING USER CIRCUIT DESIGNS IN AN INTEGRATED CIRCUIT USING DYNAMIC FUNCTION EXCHANGE

(71) Applicant: Xilinx, Inc., San Jose, CA (US)

(72) Inventors: Adam P. Donlin, San Jose, CA (US); Kyle Corbett, Campbell, CA (US); Christopher J. Case, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 15 days.

(21) Appl. No.: 17/487,781

(22) Filed: Sep. 28, 2021

(51) Int. Cl.
*G06F 30/392* (2020.01)
*G06F 30/31* (2020.01)
*G06F 30/398* (2020.01)
*G06F 111/20* (2020.01)

(52) U.S. Cl.
CPC ............ *G06F 30/392* (2020.01); *G06F 30/31* (2020.01); *G06F 30/398* (2020.01); *G06F 2111/20* (2020.01)

(58) Field of Classification Search
CPC .................................................... G06F 30/392
USPC .......................................................... 716/122
See application file for complete search history.

(56) References Cited

U.S. PATENT DOCUMENTS

| | | | |
|---|---|---|---|
| 5,768,146 A * | 6/1998 | Jassowski | H01L 27/0207 716/120 |
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,507,211 B1 | 1/2003 | Schultz et al. | |
| 6,525,562 B1 | 2/2003 | Schultz et al. | |
| 6,526,557 B1 | 2/2003 | Young et al. | |
| 6,573,748 B1 | 6/2003 | Trimberger | |
| 6,625,794 B1 | 9/2003 | Trimberger | |
| 6,759,869 B1 | 7/2004 | Young et al. | |
| 6,810,514 B1 | 10/2004 | Alfke et al. | |
| 6,836,842 B1 | 12/2004 | Guccione et al. | |
| 6,907,595 B2 | 6/2005 | Curd et al. | |
| 7,024,651 B1 | 4/2006 | Camilleri et al. | |
| 7,057,413 B1 | 6/2006 | Young et al. | |

(Continued)

OTHER PUBLICATIONS

"SDAccel Environment User Guide," UG1023 (v2018.3), Xilinx, Inc., Jan. 24, 2019, 165 pg.

*Primary Examiner* — Eric D Lee
(74) *Attorney, Agent, or Firm* — Kevin T. Cuenot

(57) ABSTRACT

Using scalable scribe regions for implementing a user circuit design includes generating a scribe region having a plurality of contours for a static top design of a circuit design for an integrated circuit. The static top design is configured to integrate with a user circuit design in the integrated circuit. Each contour defines a different size of the scribe region having a boundary that extends outward in at least one direction from a boundary of a floorplan area of the static top design on the IC. The scribe region can be translated into design constraints defining the plurality of contours of the scribe region and restrict placement of components of the user circuit design within the scribe region as sized according to a selected contour. The static top design and the plurality of design constraints can be stored in a memory for use in implementing the user circuit design.

20 Claims, 8 Drawing Sheets

(56) References Cited

U.S. PATENT DOCUMENTS

| | | |
|---|---|---|
| 7,109,750 B2 | 9/2006 | Vadi et al. |
| 7,124,338 B1 | 10/2006 | Mark et al. |
| 7,138,820 B2 | 11/2006 | Goetting et al. |
| 7,218,137 B2 | 5/2007 | Vadi et al. |
| 7,224,184 B1 | 5/2007 | Levi et al. |
| 7,233,532 B2 | 6/2007 | Vadi et al. |
| 7,235,999 B2 | 6/2007 | Goetting et al. |
| 7,302,625 B1 | 11/2007 | Payakapan et al. |
| 7,477,072 B1 | 1/2009 | Kao et al. |
| 7,478,357 B1 | 1/2009 | Mason et al. |
| 7,482,836 B2 | 1/2009 | Levi et al. |
| 7,509,617 B1 | 3/2009 | Young |
| 7,518,396 B1 | 4/2009 | Kondapalli et al. |
| 7,546,572 B1 | 6/2009 | Ballagh et al. |
| 7,599,299 B2 | 10/2009 | Goetting et al. |
| 7,619,442 B1 | 11/2009 | Mason et al. |
| 7,640,527 B1 | 12/2009 | Dorairaj et al. |
| 7,724,815 B1 | 5/2010 | Raha et al. |
| 7,746,099 B1 | 6/2010 | Chan et al. |
| 8,102,188 B1 | 1/2012 | Chan et al. |
| 8,359,448 B1 | 1/2013 | Neuendorffer |
| 8,415,974 B1 | 4/2013 | Lysaght |
| 8,719,750 B1 | 5/2014 | Balzli, Jr. |
| 8,928,351 B1 | 1/2015 | Konduru |
| 9,722,613 B1 | 8/2017 | Schultz et al. |
| 10,608,641 B2 | 3/2020 | Yu et al. |

\* cited by examiner

900

| Generate a scribe region having a plurality of contours for a static top design of a circuit design for an integrated circuit
902 |

| Translate the scribe region into a plurality of design constraints for use by an electronic design automation system, wherein the plurality of design constraints define the plurality of contours of the scribe region and restrict placement of components of the user circuit design within the scribe region
904 |

| Provide the static top design and the plurality of design constraints for use in implementing the user circuit design in the integrated circuit.
906 |

FIG. 9

SCALABLE SCRIBE REGIONS FOR IMPLEMENTING USER CIRCUIT DESIGNS IN AN INTEGRATED CIRCUIT USING DYNAMIC FUNCTION EXCHANGE

TECHNICAL FIELD

This disclosure relates to integrated circuits (ICs) and, more particularly, to using scalable scribe regions for implementing a user circuit design implemented in an IC using dynamic function exchange technology.

BACKGROUND

A programmable integrated circuit (IC) may be included on an accelerator card that is communicatively linked to a data processing system. The data processing system is typically referred to as a "host system." User circuit designs may be implemented in programmable circuitry of the programmable IC. To facilitate implementation of the user circuit designs, platform circuitry may be provided. The platform circuitry, when implemented in the programmable IC, performs various input and output functions. When a user circuit design is implemented in the programmable IC and couples to the platform circuitry, the platform circuitry communicatively links the user circuit design with the host system and/or other components located on the accelerator card.

Different user circuit designs may be loaded into and implemented in the programmable IC over time while the platform circuitry is capable of continued and uninterrupted operation. The technology that enables the loading of different user circuit designs in the programmable IC over time while the platform circuitry continues to operate uninterrupted, for example, to maintain the communication link with the host system, is referred to as dynamic function exchange or dynamic partial reconfiguration.

SUMMARY

In one or more example implementations, a method includes generating, using computer hardware, a scribe region having a plurality of contours for a static top design of a circuit design for an integrated circuit. The static top design is configured to integrate with a user circuit design in the integrated circuit. Each contour defines a different size of the scribe region that extends outward in at least one direction from a boundary of a floorplan area of the static top design on the integrated circuit. The method includes translating, using the computer hardware, the scribe region into a plurality of design constraints for use by an electronic design automation system. The plurality of design constraints define the plurality of contours of the scribe region and restrict placement of components of the user circuit design within the scribe region as sized according to a selected contour of the plurality of contours. The method includes providing the static top design and the plurality of design constraints for use in implementing the user circuit design in the integrated circuit.

In one or more example implementations, a system includes a processor configured to initiate executable operations. The executable operations include generating a scribe region having a plurality of contours for a static top design of a circuit design for an integrated circuit. The static top design is configured to integrate with a user circuit design in the integrated circuit. Each contour defines a size of the scribe region having a boundary that extends outward in at least one direction from a boundary of a floorplan area of the static top design on the integrated circuit. The operations include translating the scribe region into a plurality of design constraints for use by an electronic design automation system. The plurality of design constraints define the plurality of contours of the scribe region and restrict placement of components of the user circuit design within the scribe region as sized according to a selected contour of the plurality of contours. The operations include providing the static top design and the plurality of design constraints for use in implementing the user circuit design in the integrated circuit.

In one or more example implementations, a computer program product includes one or more computer readable storage media, and program instructions collectively stored on the one or more computer readable storage media. The program instructions are executable by computer hardware to initiate operations. The operations include generating a scribe region having a plurality of contours for a static top design of a circuit design for an integrated circuit. The static top design is configured to integrate with a user circuit design in the integrated circuit. Each contour defines a size of the scribe region having a boundary that extends outward in at least one direction from a boundary of a floorplan area of the static top design on the integrated circuit. The operations include translating the scribe region into a plurality of design constraints for use by an electronic design automation system. The plurality of design constraints define the plurality of contours of the scribe region and restrict placement of components of the user circuit design within the scribe region as sized according to a selected contour of the plurality of contours. The operations include providing the static top design and the plurality of design constraints for use in implementing the user circuit design in the integrated circuit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 9 illustrates an example method of using a scribe region for a static top design of a circuit design.

DETAILED DESCRIPTION

Figure 1:
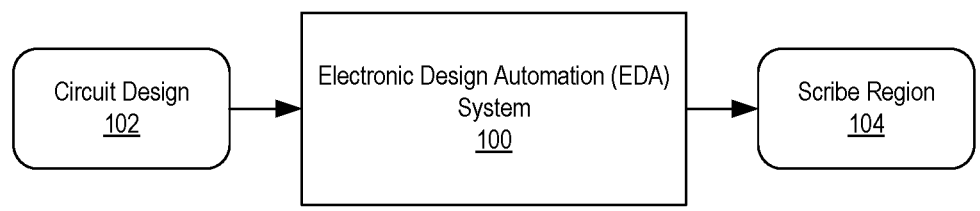
FIG. 1 illustrates an example Electronic Design Automation (EDA) system for use with the inventive arrangements described herein.

This disclosure relates to integrated circuits (ICs) and, more particularly, to using scalable scribe regions for implementing a user circuit design implemented in an IC using dynamic function exchange technology. Dynamic function exchange (DFX), also referred to as "dynamic partial reconfiguration," is a process where a region of programmable circuitry within the programmable IC referred to as a "DFX region" may be dynamically reconfigured by loading partial configuration data into the programmable IC. The partial configuration data, sometimes referred to as a partial configuration bitstream, may specify different circuitry than previously implemented in the DFX region. The partial configuration data does not specify new and/or different circuitry for portions of programmable circuitry outside of the DFX region. The DFX region may undergo modification through dynamic partial reconfiguration or dynamic function exchange, e.g., the loading of partial configuration data into the programmable IC to reconfigure the DFX region, repeatedly where each different set of partial configuration data specifies different circuitry (e.g., a different user circuit design), while the other regions of the programmable circuitry of the programmable IC referred to as "static circuitry" or "static regions" continue to operate without interruption.

The platform circuitry implemented in the programmable IC to which the user circuit designs couple is implemented as a static region of programmable circuitry. The static region may be formed entirely of programmable circuitry or of programmable circuitry and one or more hardwired circuit blocks. It is this platform circuitry that continues to operate uninterrupted while different user circuit designs are implemented in the DFX region of the programmable IC over time. The platform circuitry, for example, may implement a communication bus endpoint for communicating with a host system, one or more memory controllers, other I/O interfaces, and/or various interconnects to which the user circuit design may connect. The functionality of the platform circuitry is operational over a long period of time and is capable of servicing many different custom user circuit designs. The platform circuitry changes infrequently relative to the user circuit designs.

As such, a design objective is to minimize the footprint or size of the platform circuitry and the amount of resources of the programmable IC used to implement the platform circuitry, thereby leaving a larger number of resources of the programmable IC available for use by user circuit designs. One way of achieving this design objective is to allow nets of the platform circuitry to use routing resources that exist and/or extend outside of the floorplan area of the programmable IC in which the platform circuitry is to be implemented. Routes of the platform circuitry that use routing resources outside of the floorplan area for the platform circuitry are referred to as "bleed-over routes." While routes of the platform circuitry may be confined to being implemented entirely within the floorplan area for the platform circuitry, this mode of operation of an Electronic Design Automation (EDA) system generally does not serve to minimize the size of the floorplan area of the platform circuitry. By comparison, allowing bleed-over routes facilitates implementation of platform circuitry that satisfies aggressive area constraints and aggressive timing constraints (e.g., minimizing the floorplan area of the platform circuitry).

Still, the existence of bleed-over routes, while beneficial for reducing the floorplan area of the static circuitry, may cause problems with implementing user circuit designs. Bleed-over routes reduce the amount of routing resources of the programmable IC available in regions of the programmable IC that are reserved for implementing user circuit designs. The bleed-over routes may form localized hot spots of routing congestion that trigger unexpected issues during implementation of the user circuit design. These issues typically include circuit timing and/or routing failures and often are among the most difficult to resolve given that many users of the EDA system lack circuit design and/or programmable IC (e.g., Field Programmable Gate Array) design expertise to resolve them. These types of issues also are challenging as they may only arise in cases where certain structures in the user circuit design are allocated to particular device primitives affected by the bleed-over routes.

A user circuit design need not be particularly large to experience a bleed-over route congestion failure. Relatively small user circuit designs, for example, may be placed in a manner that causes the EDA system to fail during the routing phase of implementation of the user circuit design. The emergence of bleed-over based congestion hotspots is often difficult to predict. This means that subtle changes in the design of the platform circuitry may alter the amount or locality of the congestion such that a user circuit design that once was implemented by the EDA system without fault or failure may begin to experience implementation failures.

In accordance with the inventive arrangements described within this disclosure, platform circuitry may be provided along with a defined scribe region. The scribe region may include a plurality of different contours. The creation of the scribe region accompanying the platform circuitry allows the use of bleed-over routes to be maintained thereby facilitating the implementation of the platform circuitry within a floorplan area that is smaller in size than would otherwise be the case. Use of the scribe region also reduces the likelihood of bleed-over route congestion failures such as circuit timing and/or routing failures, thereby increasing the likelihood that a user circuit design will be implemented without issue or failure of the EDA system. Further, the use of scribe regions, as described herein, facilitates software-centric design of the user circuit design(s) and transforms the typically complex circuit timing and routing failures that are not often understood by software-centric designers into a controlled set of steps that may be undertaken in an incremental manner under guidance or control of the EDA system (e.g., automatically).

In one or more examples, an EDA system is capable of analyzing platform circuitry specified as a top-level of a circuit design. The EDA system is capable of applying one or more design heuristics to detect portions of the programmable circuitry of the programmable IC reserved for the user circuit design that have a high probability of experiencing a bleed-over route congestion failure. The EDA system is capable of determining and encoding a scribe region having a plurality of different contours that cover different regions of primitives of the programmable circuitry identified as being susceptible to bleed-over route congestion failure. By enabling different ones of the contours of the scribe region, the scribe region effectively becomes scalable.

The scribe region and the contours thereof may be provided in encoded form with the platform circuitry for use in an implementation flow that processes the user circuit design for implementation in the programmable IC. The scribe region having a size determined by the particular contour that is enabled at any given time, may operate to restrict or limit the ability of the EDA system to place components of the user circuit design in the scribe region. This has the net effect of reducing routing congestion around those bleed-over routes determined to be likely hot-spots for routing congestion. The user circuit design may undergo an iterative implementation process where the size of the scribe region is continually reduced by selectively sizing the scribe region using different ones of the contours, progressing from larger sizes to smaller sizes, for the different iterations, thereby increasing the amount of resources of the IC that are made available for implementing the user circuit design for each iteration. The end user may be systematically guided through an implementation flow that manages and reduces risk of implementation failure of the user circuit design while also providing the user with design metrics that maybe more readily understood. Further aspects of the inventive arrangements are described below with reference to the figures.

FIG. 1 illustrates an example of an EDA system 100. EDA system 100 may be implemented as a data processing system executing suitable operational software. An example of an EDA system is described in greater detail herein in connection with FIG. 10.

In the example, EDA system 100 is capable of receiving a circuit design 102. Circuit design 102 may be specified in a hardware description language. Circuit design 102 may be hierarchical and include a top-level portion that specifies platform circuitry to be implemented in a programmable IC. The top-level portion of circuit design 102 may be designated as a static partition. The circuit design can include another partition designated as a dynamic function exchange (DFX) partition in which a user circuit design may be inserted. The top-level portion, referred to herein as a "static top design," may be placed and routed so as to fit within a designated region of the programmable IC referred to as the "static top design floorplan area."

EDA system 100 is capable of analyzing circuit design 102 and generating a scribe region 104. Scribe region 104 includes a plurality of contours. In one aspect, scribe region 104 may be output as a data structure that specifies one or more design constraints for circuit design 102. Scribe region 104 may be provided with circuit design 102 to a user so that the user may create a user circuit design that may be implemented in the programmable IC. The user circuit design is implemented to couple to the platform circuitry specified by the static top design of circuit design 102.

Within this disclosure, the term "scribe region" means a defined area of a programmable IC in which components of a user circuit design are restricted from being placed or located. The scribe region is part of, or extends into, the portion of the programmable IC that is reserved for implementation of the user circuit design. The size of the scribe region is specified by one of the contours of the scribe region at any given time. Thus, the size of the scribe region is scalable, e.g., adjustable, based on the particular contour that is selected.

For purposes of description, the terminology of a scribe region having multiple contours is used. In other example implementations, rather than using a single scribe region with multiple contours, multiple scribe regions may be implemented where each different scribe region has a different size corresponding to a contour as used in this disclosure. In such an example, different scribe regions may be selected and/or selectively enabled thereby providing a scalable scribe region and facilitating the functionality described. The use of particular terminology, e.g., a scribe region with multiple contours versus multiple scribe regions, in describing the scribe region and the operation thereof in the context of user circuit design implementation is not intended as a limitation of the inventive arrangements described herein.

Figure 2:
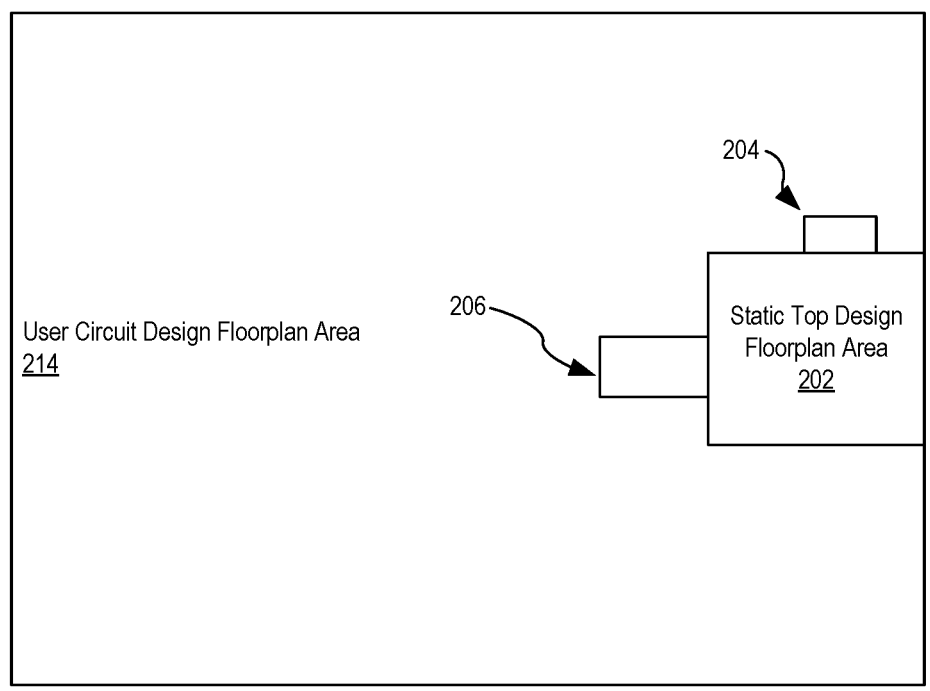
FIG. 2 is an example of a floorplan of a programmable integrated circuit (IC) where a static top design is implemented to include one or more bleed-over routes.

FIG. 2 is an example of a floorplan of a programmable IC 200 where a static top design is implemented to include one or more bleed-over routes. Programmable IC 200 includes a static top design floorplan area 202 in which platform circuitry specified by the static top design is to be implemented. That is, the platform circuitry specified as the static top design of circuit design 102 may be placed and routed to fit within static top design floorplan area 202. In doing so, EDA system 100 is capable of allowing bleed-over routes such as bleed-over route 204 and bleed-over route 206.

As defined within this disclosure, a bleed-over route is a route or signal path that connect endpoints located in the platform circuitry (e.g., a static region) and within static top design floorplan area 202. One or more of the routing resources (e.g., wires) used to implement the bleed-over route is located external to static top design floorplan area 202 and/or extends outside of static top design floorplan area 202. Such routing resources, being located in user circuit design floorplan area 214, would otherwise be reserved for use in implementing the user circuit design.

User circuit design floorplan area 214 is a region of programmable IC 200 that is reserved for implementation of a user circuit design. For example, a user circuit design included in the DFX partition of circuit design 102 is processed by EDA system 100 (e.g., synthesized, placed, and routed) to fit within user circuit design floorplan area 214 and couple to the platform circuitry implemented in static top design floorplan area 202.

EDA system 100 is capable of generating a scribe region for a static top design that includes one or more bleed-over routes. A scribe region may be generated by EDA system 100 using any of a variety of different design heuristics. Approaches for determining the probability of a bleed-over route congestion failure trade off a degree of pessimism in the assessment of the portion of user circuit design floorplan area 214 affected by the problem with a degree of design detail required for the analysis and the stability of the resulting design tool directives to changes in the static top design.

Figure 3:
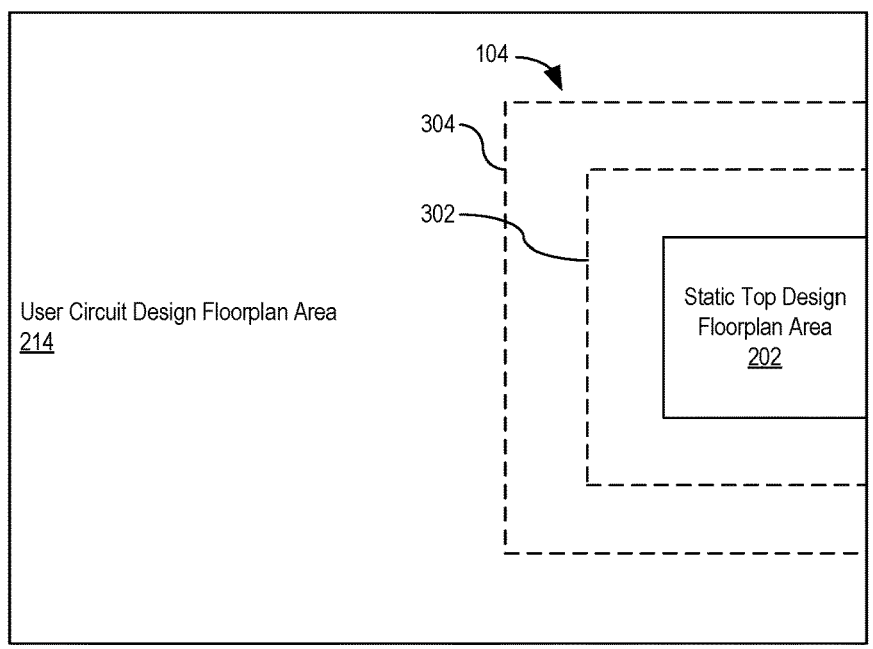
FIG. 3 illustrates an example of scribe region generation performed by an EDA system using geometric expansion.

FIG. 3 illustrates an example of scribe region generation performed by EDA system 100 using geometric expansion. The example of FIG. 3 illustrates a technique in which EDA system 100 creates a scribe region for a static top design by creating a plurality of successively larger contours. In the example of FIG. 3, EDA system 100 generates scribe region 104 including contours 302, 304 based only on the boundary geometry of static top design floorplan area 202.

In the example, EDA system 100 has generated scribe region 104 for the static top design of circuit design 102. Scribe region 104 extends outward from static top design floorplan area 202 in one or more directions. Scribe region 104 includes a plurality of different contours such as contour 302 and contour 304. The contours of scribe region 104 are sized different and, in the example, are defined to become increasingly larger, e.g., where contour 304 is larger than contour 302. In the example, while only two contours are illustrated, it should be appreciated that more than two contours may be defined for a scribe region. In one aspect, the number of contours for a scribe region may be specified as a parameter of EDA system 100. The parameter may have a default value and may be updated by user input.

In the example, the sizing of contours 302, 304 progressing outward from the boundary of static top design floorplan area 202 is uniform. That is, the distance between the boundary of static top design floorplan area 202 and contour 302 is the same as the distance between contours 302 and 304. In another example implementation, the sizing may increase in a non-linear manner, e.g., exponentially. In that case, the distance between the boundary of static top design floorplan area 202 and contour 302 is less than the distance between contours 302 and 304. In general, as described herein in greater detail below, the size of scribe region 104 is defined by the largest contour that is selected at a given time. For example, if contour 302 is selected, scribe region 104 is sized according to contour 302, e.g., has a size of contour 302. Similarly, if contour 304 is selected, scribe region 104 has a size of contour 304.

As pictured, scribe region 104 extends into, e.g., occupies, user circuit design floorplan area 214. User circuit design floorplan area 214 is a region of programmable IC 200 that is reserved for implementation of a user circuit design. For example, a user circuit design included in the DFX partition of circuit design 102 is processed by EDA system 100 (e.g., synthesized, placed, and routed) to fit within user circuit design floorplan area 214 and couple to the platform circuitry implemented in static top design floorplan area 202.

In practice, the geometric expansion technique for scribe region generation may be applied prior to implementation of the static top design since only the boundary of static top design floorplan area 202 need be considered. The geometric expansion technique illustrated in FIG. 3 may be used without revealing any implementation details of the static top design. Because generation of the scribe region including contours is not dependent an implemented static top design, scribe region generation does not reveal any information relating to the structure or implementation of the static top design to the end user. Such confidentiality of the static top design may be desirable in certain computing environments including data centers and those that offer Field Programmable Gate Array (FPGA)-as-a-service. Further, the lack of information needed relating to the static top design top means that design principles employed in creating the static top design may remain confidential and unavailable to hostile parties or users that could otherwise use such information in initiating a side-channel or direct attack on system (e.g., accelerator card and/or host system).

In one or more examples, the size of each contour may be measured or defined in terms of programmable circuit blocks (e.g., programmable tiles or "sites") of the programmable IC. For example, contour 302 may be set to a distance of 10 sites from the boundary of static top design floorplan area 202, while contour 304 is set to a distance of 20 sites from the boundary of static top design floorplan area 202.

Figure 4:
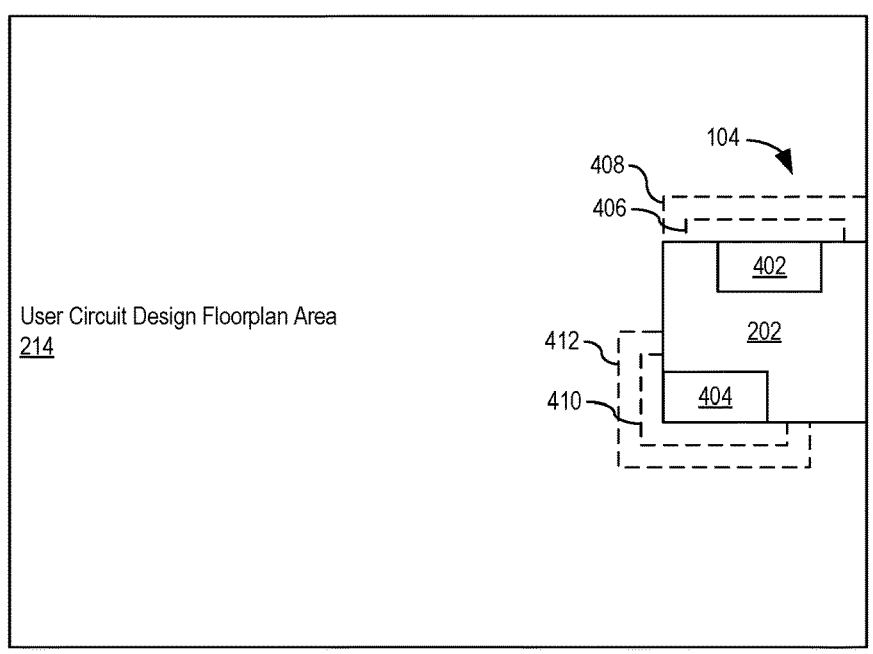
FIG. 4 illustrates an example of scribe region generation performed by an EDA system that uses location(s) of placed primitives of the static top design.

FIG. 4 illustrates an example of scribe region generation performed by EDA system 100 that uses location(s) of placed primitives of the static top design. In one or more example implementations, different static top designs may be analyzed and observed as different accelerator circuit designs representative of user circuit designs are implemented with the different static top designs. Based on the resulting implementations, those that resulted in a bleed-over route congestion failure may be recorded. Further, the source or cause of the bleed-over route congestion failure may be recorded as a design heuristic. The design heuristics may be encoded within EDA system, e.g., as rules that may be interpreted or executed by EDA system 100 to analyze other static top designs and/or user circuit designs. EDA system 100 is capable of applying the design heuristics to other static top designs and/or user circuit designs for the purpose of determining a probability that such other static top designs, e.g., a given static top design, will also experience a bleed-over route congestion failure when used or combined with a user circuit design.

In one aspect, the design heuristics may be a list of one or more primitives and a proximity of each respective primitive, e.g., as placed, to the boundary of static top design floorplan area 202. For example, the design heuristics may specify a list of one or more primitives that, when included in the static top design and located (e.g., placed) within a predetermined distance of the boundary of static top design floorplan area 202, for a particular type of programmable IC, specify a probability that a bleed-over route congestion failure will occur while EDA system 100 attempts to implement a user circuit design for use with the static top design.

In the example of FIG. 4, the size of the contours may be reduced relative to the size of the contours illustrated in the example of FIG. 3. In some cases, the scribe region size may be reduced or eliminated on a local basis depending on the absence of primitives found in the design heuristics or how far away such primitives are from the boundary of static top design floorplan area 202. In the example of FIG. 4, primitives 402 and 404 are of particular types and are located within a predetermined distance of the boundary of static top design floorplan area 202. Scribe region 104 is created having a plurality of contours 406, 408, 410, and 412. Contours 406 and 408 correspond to primitive 402. Contours 410 and 412 correspond to primitive 404.

In an example, the size of scribe region 104 may be defined by selecting contour 408 and 412 resulting in a largest size available for scribe region 104. In another example, contours 406 and 412 may be selected resulting in a reduction in size of scribe region 104 relating to primitive 402. In another example, contours 408 and 410 may be selected resulting in a reduction in size of scribe region 104 relating to primitive 404. In another example, contours 406 and 410 may be selected resulting in a reduction in size of scribe region 104 relating to both primitives 402, 404.

As illustrated in the example of FIG. 4, in particular localized areas surrounding static top design floorplan area 202, scribe region 104 does not exists or in other words is equivalent to the boundary of static top design floorplan area 202 thereby illustrating the potential reduction in size compared to the example of FIG. 3. In other examples, contours of scribe region 104 may extend outward from the boundary of static top design floorplan area 202 on only one or more (e.g., but fewer than all) of the edges of static top design floorplan area 202.

The design heuristics may also specify the spacing of contours that are to be created based on the location of the primitives relative to the boundary of static top design floorplan area 202. For example, the amount that each contour extends out into user circuit design floorplan area 214 may depend on the particular type of primitive and the distance of such primitive to the boundary of the static top design floorplan area 202. Contours may extend deeper into user circuit design floorplan area 214 as primitives are placed closer to the boundary of static top design floorplan area 202.

In another example, density of placed primitives may be evaluated as part of the design heuristics used in the example of FIG. 3. In cases where the density of placed primitives along a particular edge (e.g., the top, bottom, or left edge) of static top design floorplan area 202 is less than a predetermined placement density, the contour of scribe region 104 may be reduced to the boundary of the static top design floorplan area 202.

The design heuristics may also specify the spacing of contours that are to be created based on the density of the primitives along the boundary of static top design floorplan area 202. For example, the amount that each contour extends out into user circuit design floorplan area 214 may depend on the density of primitives along the boundary of static top design floorplan area 202. Contours may extend deeper into user circuit design floorplan area 214 with increasing density.

Figure 5:
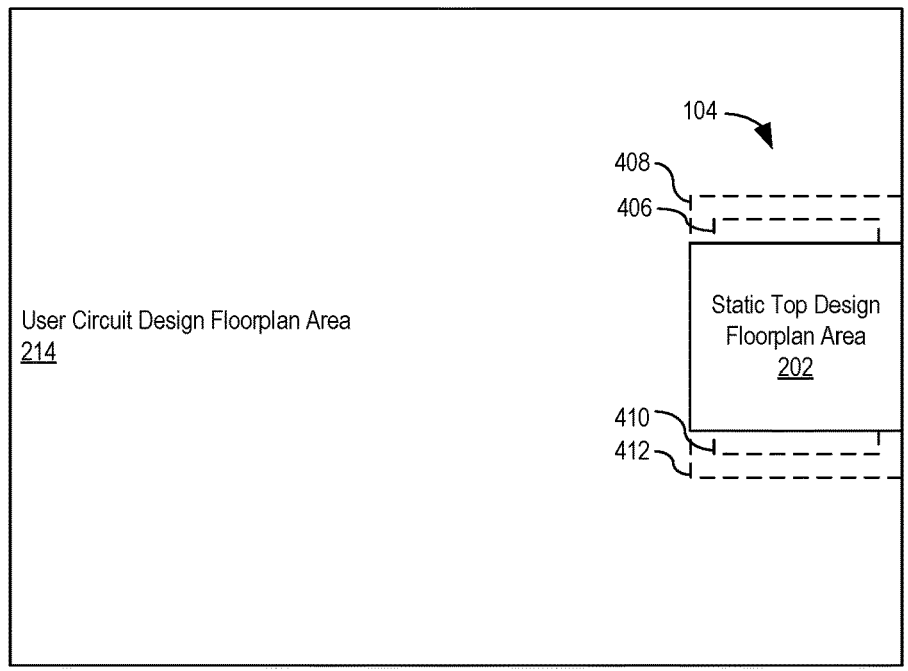
FIG. 5 illustrates an example of scribe region generation performed by an EDA system that uses primitive density.

FIG. 5 illustrates an example of scribe region generation performed by EDA system 100 that uses primitive density. In the example of FIG. 5, the density of primitives along the edge of static top design floorplan area 202 or within a predetermined distance of the edge (e.g., boundary) of static top design floorplan area 202 is used for scribe region generation. In the example of FIG. 5, the primitive density for the left edge of static top design floorplan area 202 is below the placement density threshold thereby resulting in scribe region 104 not extending out beyond the boundary of static top design floorplan area 202 on the left edge.

Scribe region 104 exists on the top edge and bottom edge with multiple contours 406, 408, 410, and 410 as previously described. In the examples of FIGS. 4 and 5, the placement density may be evaluated on a per primitive basis, across all primitives within a predetermined distance of the boundary for a particular edge of static top design floorplan area 202, or using a combination of both (e.g., where each is weighted and contributes to a total density).

In particular examples, placement density-related design heuristics may account for specific IC device architectures while other placement density-related design heuristics may benefit from consideration of second order effects. As an example, the placement density design heuristic that triggers generation of a scribe region may be calibrated differently based on the types of primitive columns in the specific target IC and the diversity of placed primitive types in the local neighborhood of each edge of static top design floorplan area 202.

For example, instantiations of primitives with denser signaling (e.g., a larger number of signals/wires connected thereto) such as memory circuit blocks and/or digital signal processing (DSP) circuit blocks may be weighed differently from primitive columns that have lower density signaling (e.g., fewer signals/wires connected thereto) such as lookup tables. As such, the plurality of contours of the scribe region may be generated based, at least in part, on wire density (the number of signals/wires) of placed primitives of the static top design within a predetermined distance of the boundary of the floorplan area of the static top design.

Figure 6:
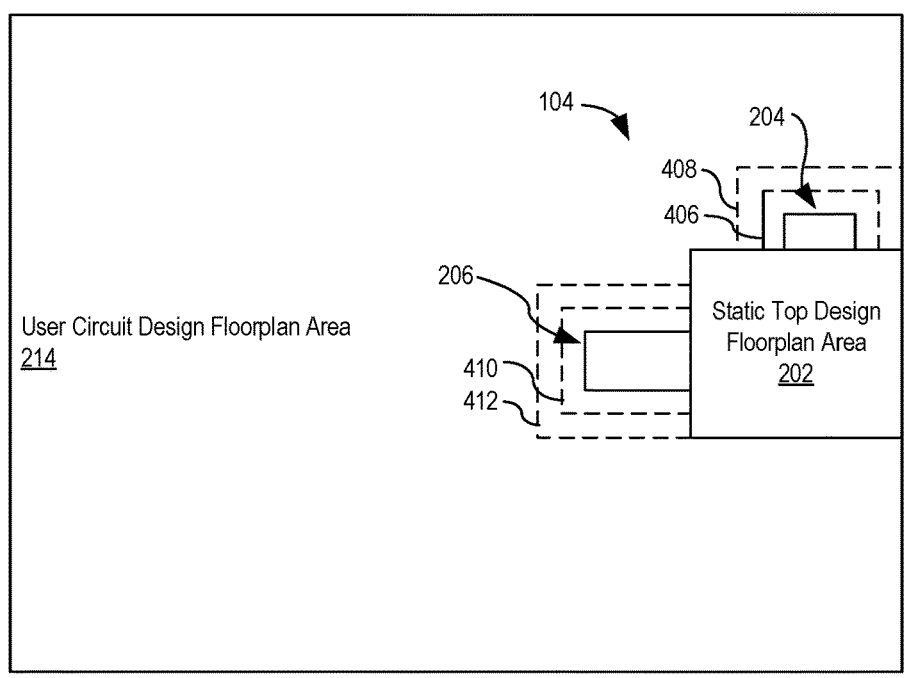
FIG. 6 illustrates an example of scribe region generation performed by an EDA system that uses bleed-over routes of the static top design.

FIG. 6 illustrates an example of scribe region generation performed by EDA system 100 that uses bleed-over routes of the static top design. In the example of FIG. 6, EDA system 100 is capable of analyzing the design database for the static top design of circuit design 102 to identify the particular bleed-over routes and the routing resources utilized in the bleed-over routes. For example, EDA system 100 is capable of detecting bleed-over routes 204 and 206 for the static top design.

The example of FIG. 6 provides a finer-grained view or analysis of the routing congestion that may occur due to bleed-over routes. In one example implementation, the design heuristic for each bleed-over route may be computing the percentage of routing resource utilization in a local neighborhood surrounding the bleed-over route and determining whether the routing resource utilization exceeds a predetermined utilization threshold. In response to determining that the routing resource utilization exceeds the utilization threshold, EDA system 100 is capable of creating scribe region 104 including one or more contours.

In another example implementation, the design heuristics may be augmented to account for second order effects. For example, the design heuristic may also account for length of routing resources (e.g., wires) used by a bleed-over route where route length influences geometry of the contours that are created. Within different IC architectures, routing resources of different lengths may be provisioned to implement nets or routes. In response to a determining that a concentration of long routing resources, e.g., exceeding a threshold number, have been consumed by the static top design, the extent of those routing resources that exist in user circuit design floorplan area 214 may be considered resulting in an elongation of a contour to account for longer length routing resources used by the static top design that become unavailable to the user circuit design. Bleed-over routes that consume relatively shorter routing resources of the IC may have a lesser effect on elongating contour shapes because the depleting effect of routes using such routing resources is more localized to the edge of the static top design.

Using actual routing data for the static top design allows EDA system 100 to create a scribe region that is tailored to the particular needs of the static top design in terms of both size and location.

Figure 7:
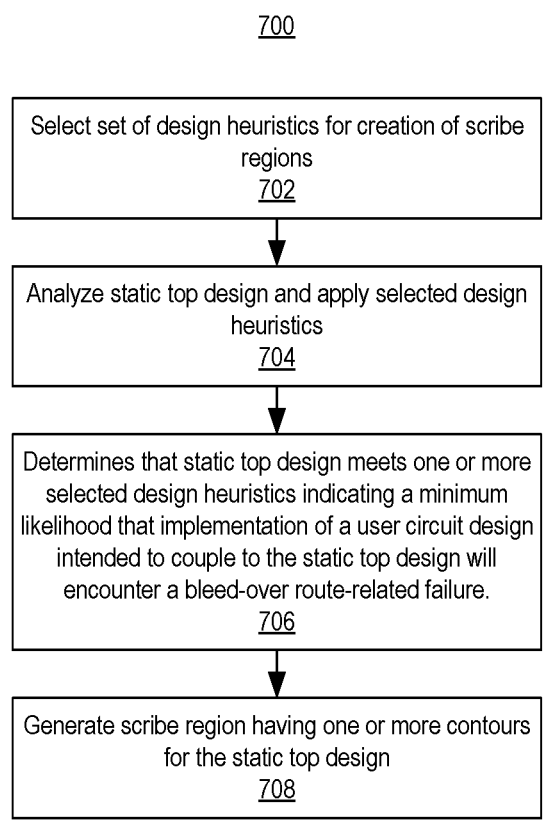
FIG. 7 illustrates an example method of scribe region generation as performed by an EDA system.

FIG. 7 illustrates an example method 700 of scribe region generation as performed by EDA system 100. In block 702, a set of design heuristics for creation of a scribe region may be selected. In one aspect, the design heuristics selected for creation of scribe regions may implement the geometric expansion technique described in connection with FIG. 3. In another aspect, the design heuristics selected for creation of scribe regions may implement a placement-based technique as described in connection with FIG. 4 or a density-based technique as described in connection with FIG. 5. In another aspect, the design heuristics selected for creation of scribe regions may implement a bleed-over route-based technique as described in connection with FIG. 6.

In one aspect, a default setting may be included in EDA system 100 that specifies the design heuristics to be used for purposes of scribe region generation. In one or more example implementations, the setting may be adjusted or overridden by the user. In other aspects, EDA system 100 may query the user for input selecting a particular set of design heuristics for use in generating scribe regions at the start of method 700 or in response to determining that the static top design does include one or more bleed-over routes.

In block 704, EDA system 100 analyzes the static top design and applies the selected design heuristics thereto.

In block 706, EDA system 100 determines that the static top design meets one or more of the selected design heuristics indicating a minimum likelihood, e.g., a minimum probability, that implementation of a user circuit design (e.g., as of yet unspecified) intended to couple to the platform circuitry will encounter a bleed-over route congestion failure.

In one or more example implementations, EDA system 100 is capable of determining that the static top design of the circuit design to be evaluated includes one or more actual bleed-over routes. In other example implementations, e.g., geometric expansion, an assessment of the likelihood of a blood-over route congestion failure occurring need not be performed. For example, in the case where geometric expansion is the selected set of design heuristics, the minimum probability of a bleed-over route congestion failure occurring may be assumed.

In block 708, in response to the determination made in block 706, EDA system 100 generates a scribe region having one or more contours as described within this disclosure. As part of generating the scribe region including contours, EDA system 100 generates one or more design constraints that define the scribe region and the plurality of contours. For example, EDA system 100 is capable of translating the scribe region (including contours) into actual design constraints (e.g., encoding the scribe region into design constraints) that are understandable by EDA system 100 or another such EDA system that may be used by a user in creating a user circuit design to be used with the platform circuitry. The design constraints may be associated with the static top design. In one or more example implementations, EDA system 100 is capable of packing the design constraints specifying the scribe region and contours with, or as part of, the static top design so that the static top design may be provided with the scribe region and contours to one or more end users.

In the examples described within this disclosure, the determination of whether to create a scribe region for a static top design has depended on characteristics of the static top design itself as determined by EDA system 100. In one or more other example implementations, characteristics of the user circuit design may be also factored into the design heuristics for scribe region generation.

In one or more example implementations, EDA system 100 is capable of analyzing the user circuit design to detect whether selected primitives that have dense signaling (e.g., memory blocks and/or DSP blocks) are located within a predetermined distance of the boundary or edge of the static top design floorplan area 202. In such cases, EDA system 100 is capable of relying on the signal density of primitives of the user circuit design at or near the boundary of static top design floorplan area 202, the signal density of the primitives of the static top design at or near static top design floorplan area 202, or both to determine whether to create a scribe region for the static top design. In cases where EDA system 100 considers characteristics of the user circuit design, such implementations may be performed as or during implementation of the user circuit design with the static top design. That is, the design constraints defining the static region need not be determined a priori and delivered with the static top design to the user, but rather generated by EDA system 100 (e.g., or another EDA system used by the user) during development of the user circuit design and/or implementation of the user circuit design for use with the static top design. Use of a user circuit design-based design heuristic for scribe region generation as described may be used in cases where the static top design has relatively few primitive placements and/or bleed-over routes, e.g., an amount that does not exceed any predetermined thresholds, in anticipation of high demand for routing resources in the user circuit design floorplan area 214.

In one or more example implementations, a method of circuit design using EDA system 100 is capable of utilizing a progressive application of the different design heuristics. For example, EDA system 100 is capable of first using the geometric expansion-based design heuristics at the start of the design process for a static top design. As the static top design becomes more mature over time, EDA system 100 may begin utilizing the primitive placement-based design heuristics and/or density-based design heuristics. Subsequently, other design heuristics relying on the specific instances of bleed-over routes may be used as the static top grows even more mature. Thus, as a static top design continues maturing and is continually updated and/or deployed to end users over the course of weeks or months, the design metrics used to create the scribe region deployed with the static top design may also evolve over time.

Referring to the example of FIG. 7, method 700 may be implemented wherein design constraints implementing the geometric expansion type of scribe region are selected. During a subsequent iteration through method 700 as the static top design matures, the placement and/or density-based design heuristics may be used. As the static top design becomes even more mature, the design heuristics relating to specific bleed-over routes may be selected for a further iteration through method 700.

In implementing a user circuit design with a particular static top design, the scribe region determined for the static top design is expressed as a plurality of design constraints. The design constraints may be correlated with particular contours of the plurality of contours of the scribe region. Each contour of the scribe region, for example, may be defined by a particular subset of the plurality of design constraints. By selectively enabling particular subsets of the plurality of design constraints, different contours of the scribe region may be enabled at different times having the net effect of changing the shape of the scribe region depending on the particular contour that is enabled at any given time.

In one aspect, a scribe region may be encoded using "subtractive PBLOCK" constraints. A "PBLOCK" refers to a physical block or physical region on the programmable IC. Subtractive PBLOCK constraints may be used to describe each contour of the scribe region. Subtractive PBLOCK constraints are suited to creating a scribe region formed of a series of smaller contiguous rectangles. For example, subtractive PBLOCK constrains may be used to form a scribe region corresponding to the example of FIG. 3.

For purposes of illustration, consider an example where the scribe region is to be created where contours are separated by a particular number of programmable circuit blocks (e.g., programmable tiles or sites) of the programmable IC. Referring to the example of FIG. 3, contour 302 may be specified as a PBLOCK scribe region having a boundary that extends 10 programmable circuit blocks out from the boundary of each edge of static top design floorplan area 202. Contour 304 may be specified as a further PBLOCK scribe region having a boundary that extends 10 tiles out from contour 302.

In generating the scribe region, EDA system 100 is capable of generating a first PBLOCK scribe region corresponding to contour 304 and a second PBLOCK scribe region corresponding to contour 302. Both the first and second PBLOCK scribe regions may be designated as children of the PBLOCK region corresponding to user circuit design floorplan area 214.

In generating the first PBLOCK scribe region, EDA system 100 is capable of detecting each programmable circuit block in the PBLOCK region that is adjacent to static top design floorplan area 202. For each programmable circuit block adjacent to static top design floorplan area 202, EDA system 100 is capable of adding to the first PBLOCK scribe region the adjacent programmable circuit block and further programmable circuit blocks extending from the adjacent programmable circuit block into user circuit design floorplan area 214 for a range of 20 programmable circuit blocks. Each PBLOCK child of the PBLOCK region corresponding to user circuit design floorplan area 214 may have an "exclude placement" attribute that may be set that will cause EDA system 100 to exclude that PBLOCK from use during placement of the user circuit design. In this example, the "exclude placement" attribute of the first PBLOCK scribe region may be set to true. With first PBLOCK scribe region being a child of the PBLOCK region corresponding to user circuit design floorplan area 214, while placing the user circuit design, EDA system 100 will not place components of the user circuit design within the first PBLOCK scribe region.

The second scribe region corresponding to contour 302 may be defined as described above albeit adding programmable circuit blocks to only encompass 10 programmable circuit blocks as opposed to 20. During implementation of a user circuit design, EDA system 100 may use an implementation strategy that first enables the design constraints corresponding to the first PBLOCK scribe region and, for a subsequent iteration disables the design constraints corresponding to the first PBLOCK scribe region (e.g., set the exclude placement for the first PBLOCK to false) and enables the design constraints corresponding to the second PBLOCK scribe region.

Depending on the particular EDA system that is used and the manner in which the EDA system interprets design constraints, such design constraints may or may not overlap. For example, PBLOCK constraints may be subtracted from user circuit design floorplan area 214. In other examples, PBLOCK constraints may be additive as opposed to subtractive thereby allowing PBLOCK constraints to be added or reincorporated for a particular implementation attempt of the user circuit design.

In another aspect, a scribe region may be encoded using "prohibit constraints." A prohibit constraint is effectively a compiler directive instructing the compiler not to use a particular programmable circuit block of the programmable IC. Prohibit constraints may be applied on a per programmable circuit block basis. As such, prohibit constraints may be used for the placement-related and bleed-over route-specific design heuristics. The prohibit constraints allow the generation of a scribe region and contours with irregular (e.g., non-rectangular) shapes.

In using prohibit constraints, the prohibit constraints may be augmented with a value or identifier indicating the particular contour to which each prohibit constraint belongs. A prohibit constraint may belong to more than one contour. Accordingly, to enable a particular contour using prohibit constraints, EDA system 100 need only enable each prohibit constraint associated with a particular contour of the scribe region. In certain implementations, values indicating the ordering in which sets of design constraints are to be implemented and/or removed may be used in connection with the PBLOCK-based design constraints described above.

Figure 8:
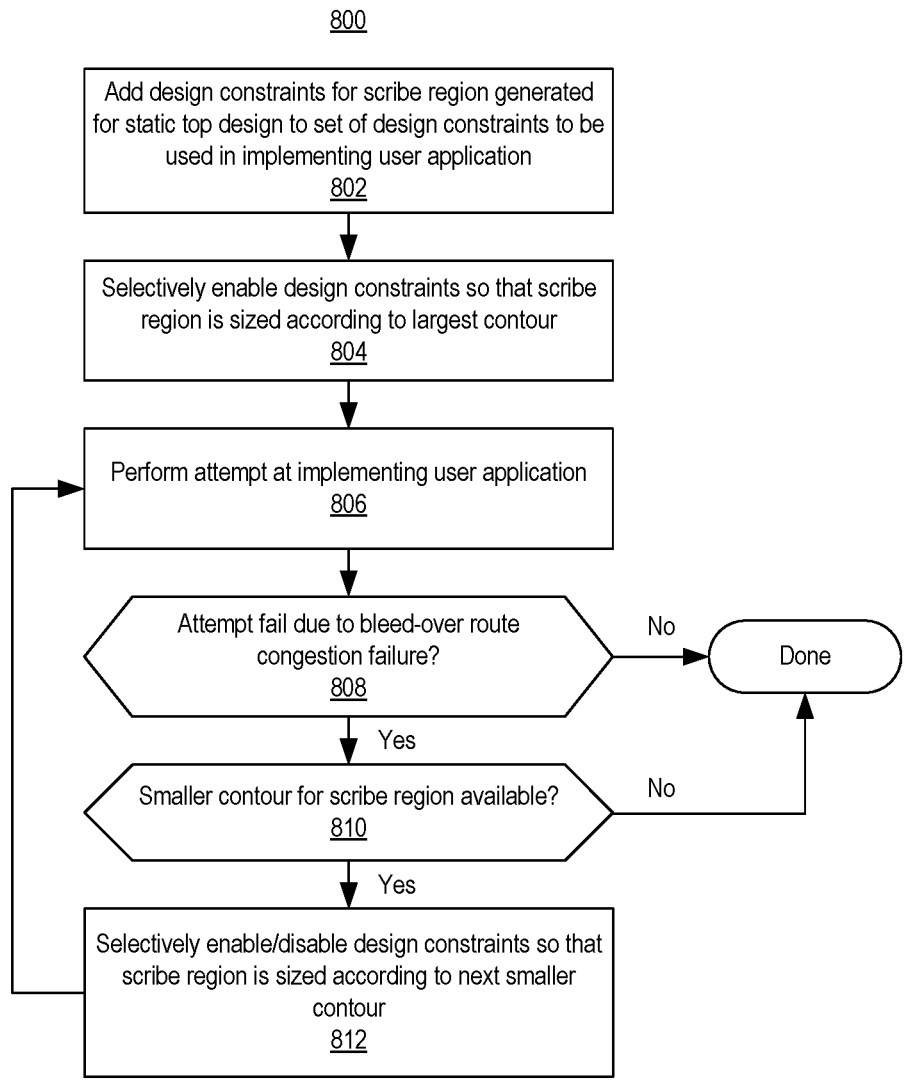
FIG. 8 illustrates an example method of implementing a user circuit design using a scribe region as performed using an EDA system.

FIG. 8 illustrates an example method 800 of implementing a user circuit design using an EDA system as described herein. In block 802, the design constraints for a scribe region generated for a static top design may be added to the set of design constraints to be used and/or observed in implementing a user circuit design. The user circuit design is to be implemented to couple to the platform circuitry specified by the static top design. For example, in creating a project and designating a particular static top design, the EDA system may import that static top design and the design constraints defining the scribe region for that static top design.

In block 804, the EDA system is capable of selectively enabling design constraints so that the scribe region associated with the static top design is sized according to a largest contour of the set of contours for the scribe region that is available.

In block 806, the EDA system performs an attempt at implementing the user circuit design. For example, the EDA system is capable of attempting synthesis, placement, and routing for the user circuit design so that the user circuit design couples to the static top design. In attempting the implementation, the EDA system observes the design constraints that are in effect, e.g., enabled.

In block 808, the EDA system determines whether the attempted implementation of the user circuit design failed due to a bleed-over route congestion failure. In response to determining that the attempted implementation failed due to a bleed-over route congestion failure, method 800 continues to block 810. In response to determining that the attempted implementation did not fail or failed due to an error other than a bleed-over route congestion failure, method 800 may end.

In the example of FIG. 8, the EDA system may also base the determination made in block 808 on whether a contour of the scribe region was enabled for the attempted implementation. That is, if no contour was enabled, meaning that a scribe region was effectively deactivated or non-existent while performing block 806, method 800 may end.

In block 810, the EDA system is capable of determining whether a smaller contour for the scribe region, compared to the contour just used in the most recent iteration of block 804, is available. If so, method 800 continues to block 812. If not, method 800 may end.

In block 812, the EDA system is capable of selectively enabling/disabling design constraints so that the size of the scribe region is sized according to the next smaller contour. Reducing the size of the scribe region by using a smaller or next smaller contour makes additional circuit blocks available to the user circuit design for implementation thereby increasing the likelihood that implementation of the user circuit design will succeed during the next iteration. After block 812, method 800 may loop back to block 806 to perform additional attempts at implementing the user circuit design using the smaller scribe region.

The example method of FIG. 8 increases the likelihood that a user circuit design will be successfully implemented while also providing an application developer with a more understandable workflow and error messaging. The design constraints that are in effect to create the scribe region deflect components of the user circuit design from being placed in high-risk regions of programmable IC. Any residual implementation failures are more likely to be in the form of insufficient availability of a primitive resource type. These types of failures are easier for a software-centric developer to understand and mitigate than failure modes relating to timing closure or failed routing due to congestion (e.g., bleed-over route congestion failure). Moreover, method 800 may be used to address an implementation failure due to insufficient primitive resources.

Method 800 may be used to implement the user circuit design and to report on a final status of an implemented user circuit design. In accordance with the example of FIG. 8, the EDA system is capable of releasing additional circuit resources by reducing the size of the scribe region until implementation of the user circuit design succeeds, the implementations fail for reasons other than failed routing or failed timing closure, or the implementation fails for any reason with all of the contours of the scribe region having been exhausted (e.g., used or tried).

The organization of additive PBLOCKs into scribe contour layers may be accomplished using a naming convention where the inner-most or smallest contour corresponds to PBLOCK_scribe0, while the next larger contour is named PBLOCK_scribe1, etc. Annotation of prohibit constraints may be used so that such constraints may be assigned to different contours (e.g., contour levels) so that the size of the scribe region may be progressively reduced.

It should be appreciated that the particular way in which the size of the scribe region is reduced or changed may depend on the particular way in which design constraints are specified and/or interpreted in an EDA system. Accordingly, whether additive techniques are used, subtractive techniques, or other techniques are used is not intended as a limitation of the inventive arrangements. The inventive arrangements contemplate using progressively smaller scribe regions over different iterations of attempting to implement the user circuit design.

FIG. 9 illustrates a method 900 of using a scribe region for a static top design of a circuit design. Method 900 may be performed by an EDA system as described herein. An example of an EDA system is described in connection with FIG. 10.

In block 902, the EDA system is capable of generating a scribe region having a plurality of contours for a static top design of a circuit design for an IC. The static top design is configured to integrate with a user circuit design in the IC. Each contour defines a different size of the scribe region having a boundary that extends outward in at least one direction from a boundary of a floorplan area of the static top design on the integrated circuit. In block 904, the EDA system is capable of translating the scribe region into a plurality of design constraints for use by the EDA system or another EDA system. The plurality of design constraints define the plurality of contours of the scribe region and restrict placement of components of the user circuit design within the scribe region as sized by a selected contour of the plurality of contours. As noted, the translation ensures that the scribe region and contours are encoded in a format that is interpretable or executable by an EDA system. In block 906, the EDA system is capable of providing the static top design and the plurality of design constraints for use in implementing the user circuit design in the IC.

In one or more example implementations, method 900 may be performed in response to EDA system 100 determining that a static top design of a circuit design for an IC is susceptible to a bleed-over route congestion failure. The EDA system, for example, analyzes the static top design using the various design heuristics described herein to determine whether the probability of a bleed-over route congestion failure occurring exceeds a threshold probability and/or has one or more actual bleed-over routes.

The foregoing and other implementations can each optionally include one or more of the following features, alone or in combination. Some example implementations include all the following features in combination.

In another aspect, the EDA system (or another EDA system) is capable of initiating an implementation of the user circuit design with the scribe region sized according to a first contour. In response to the implementation of the user circuit design failing, the EDA system is capable of resizing the scribe region according to a second contour. The second contour defines a physical region of the IC that is smaller in size than a physical region of the IC defined by the first contour. The EDA system is capable of initiating a further implementation of the user circuit design using the scribe region defined by the second contour. In one or more example implementations, the implementation of the user circuit design fails, e.g., the detected failure, is a bleed-over route congestion failure.

It should be appreciated that sizing the scribe region according to a selected contour causes any design constraints that define the selected contour to be put into effect or enabled for use by the EDA system to create a scribe region sized according to the selected contour.

In another aspect, in response to each of a plurality of unsuccessful implementation attempts of the user circuit design, the EDA system is capable of selecting a contour of the scribe region used for a next implementation attempt of the user circuit design. The selected contour defines a smaller physical region of the IC than was used for each prior failed implementation attempt of the user circuit design.

In another aspect, the plurality of contours of the scribe region are generated through geometric boundary expansion of the floorplan area of the static top design in one or more directions.

In another aspect, the plurality of contours of the scribe region are generated based on proximity of placed primitives of the static top design to the boundary of the floorplan area of the static top design.

In another aspect, the plurality of contours of the scribe region are generated based on density of placed primitives of the static top design within a predetermined distance of the boundary of the floorplan area of the static top design.

In another aspect, the plurality of contours of the scribe region are generated based on routing resources used by the static top design that extend outside of the boundary of the floorplan area of the static top design.

In another aspect, the plurality of contours of the scribe region are generated based on a length of the routing resources used by the static top design that extend outside of the boundary of the floorplan area of the static top design.

In another aspect, the plurality of contours of the scribe region are generated based on wire density of primitives of the static top design placed within a predetermined distance of the boundary of the floorplan area of the static top design.

In another aspect, the plurality of contours of the scribe region are generated based on wire density of primitives of the user circuit design placed within a predetermined distance of the boundary of the floorplan area of the static top design.

The inventive arrangements described within this disclosure are capable of analyzing a static top design and automatically determining, or inferring, regions of bleed-over route congestion, generating scribe regions, and applying the scribe regions when and/or during implementation of a user circuit design to be integrated with the static top design. Each scribe region generated may include a plurality of contours that define different sizing for the scribe region. The contours for a scribe region may be a series of abutting layers. The scribe region may be incrementally adjusted in size by enabling different ones of the contours for different iterations of attempted implementations of the user circuit design.

Figure 10:
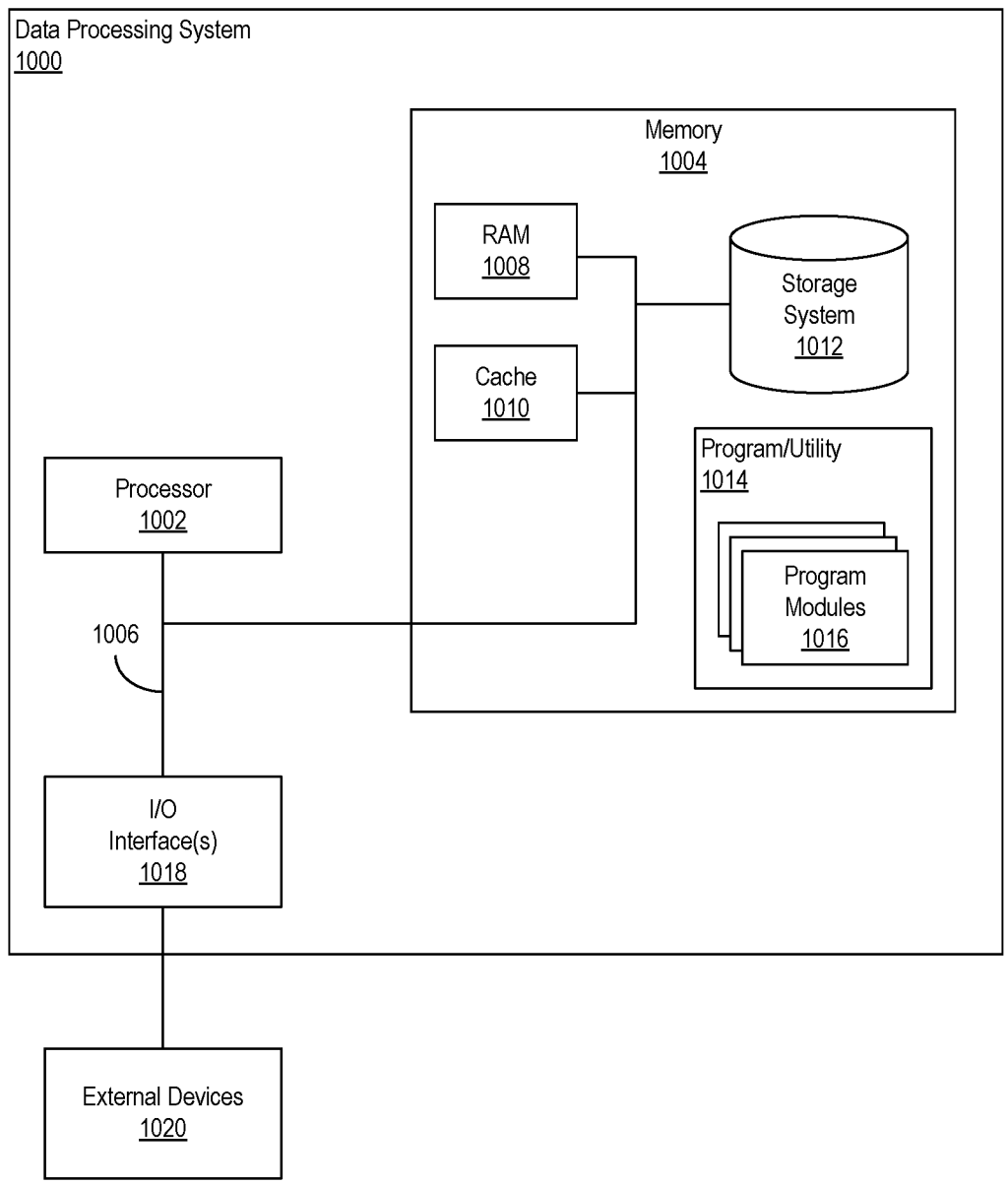
FIG. 10 illustrates an example implementation of a data processing system for use with the inventive arrangements described herein.

FIG. 10 illustrates an example implementation of a data processing system 1000. Data processing system 1000 is an example implementation of an EDA system such as EDA system 100 of FIG. 1 and/or an EDA system as may be used by a user in implementing a user circuit design.

The components of data processing system 1000 can include, but are not limited to, a processor 1002, a memory 1004, and a bus 1006 that couples various system components including memory 1004 to processor 1002. Processor 1002 may be implemented as one or more processors. In an example, processor 1002 is implemented as a central processing unit (CPU). Example processor types include, but are not limited to, processors having an x86 type of architecture (IA-32, IA-64, etc.), Power Architecture, ARM processors, and the like.

Bus 1006 represents one or more of any of a variety of communication bus structures. By way of example, and not limitation, bus 1006 may be implemented as a Peripheral Component Interconnect Express (PCIe) bus. Data processing system 1000 typically includes a variety of computer system readable media. Such media may include computer-readable volatile and non-volatile media and computer-readable removable and non-removable media.

Memory 1004 can include computer-readable media in the form of volatile memory, such as random-access memory (RAM) 1008 and/or cache memory 1010. Data processing system 1000 also can include other removable/non-removable, volatile/non-volatile computer storage media. By way of example, storage system 1012 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1006 by one or more data media interfaces. Memory 1004 is an example of at least one computer program product.

Program/utility 1014, having a set (at least one) of program modules 1016, may be stored in memory 1004. Program/utility 1014 is executable by processor 1002. By way of example, program modules 1016 may represent an operating system, one or more application programs, other program modules, and program data. Program modules 1016, upon execution, cause data processing system 1000, e.g., processor 1002, to carry out the functions and/or methodologies of the example implementations described within this disclosure. Program/utility 1014 and any data items used, generated, and/or operated upon by data processing system 1000 are functional data structures that impart functionality when employed by data processing system 1000.

Data processing system 1000 may include one or more Input/Output (I/O) interfaces 1018 communicatively linked to bus 1006. I/O interface(s) 1018 allow data processing system 1000 to communicate with one or more external devices 1020 and/or communicate over one or more networks such as a local area network (LAN), a wide area network (WAN), and/or a public network (e.g., the Internet). Examples of I/O interfaces 1018 may include, but are not limited to, network cards, modems, network adapters, hardware controllers, etc. Examples of external devices also may include devices that allow a user to interact with data processing system 1000 (e.g., a display, a keyboard, and/or a pointing device) and/or other devices such as an accelerator card.

Data processing system 1000 is only one example implementation. Data processing system 1000 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 10 is not intended to suggest any limitation as to the scope of use or functionality of example implementations described herein. Data processing system is an example of computer hardware that is capable of performing the various operations described within this disclosure.

In this regard, data processing system 1000 may include fewer components than shown or additional components not illustrated in FIG. 10 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1000 may be operational with numerous other general-purpose or special-purpose computing system environments or configurations. Examples of computing systems, environments, and/or configurations that may be suitable for use with data processing system 1000 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1000 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Program modules 1016 also may include software that is capable of performing an implementation flow on a circuit design or portion thereof. In this regard, data processing system 1000 serves as an example of one or more EDA tools or a system that is capable of processing circuit designs through a design flow.

Figure 11:
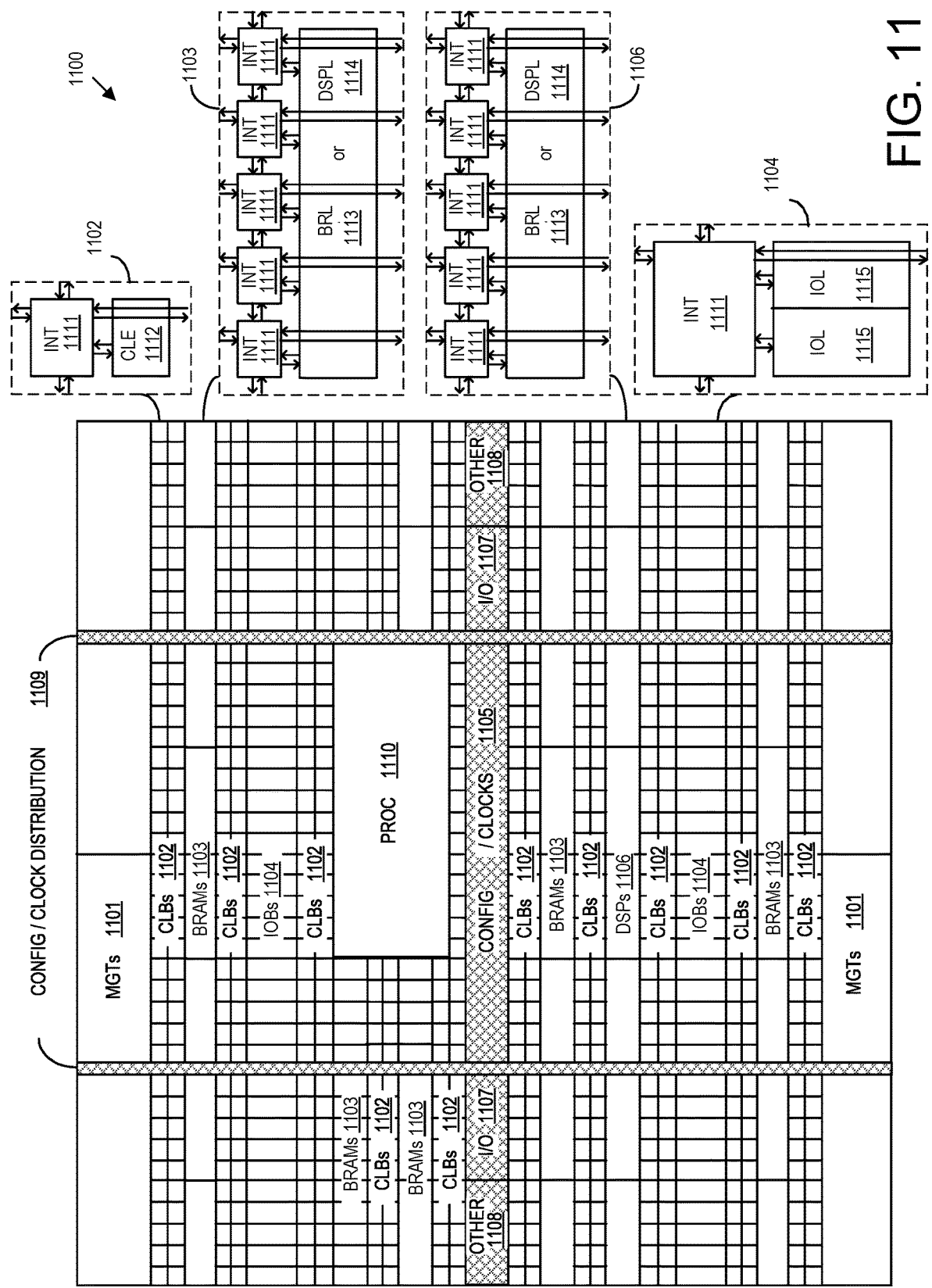
FIG. 11 illustrates an example architecture for an integrated circuit (IC).

FIG. 11 illustrates an example architecture 1100 for an IC. In one aspect, architecture 1100 may be implemented within a programmable IC. A programmable IC is an IC with at least some programmable circuitry. Programmable circuitry may include programmable logic. For example, architecture 1100 may be used to implement a field programmable gate array (FPGA). Architecture 1100 may also be representative of a system-on-chip (SoC) type of IC. An example of an SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1100 includes several different types of programmable circuit, e.g., logic, blocks. For example, architecture 1100 may include a large number of different programmable tiles including multi-gigabit transceivers (MGTs) 1101, configurable logic blocks (CLBs) 1102, random-access memory blocks (BRAMs) 1103, input/output blocks (IOBs) 1104, configuration and clocking logic (CONFIG/CLOCKS) 1105, digital signal processing blocks (DSPs) 1106, specialized I/O blocks 1107 (e.g., configuration ports and clock ports), and other programmable logic 1108 such as digital clock managers, analog-to-digital converters, system monitoring logic, and so forth.

In some ICs, each programmable tile includes a programmable interconnect element (INT) 1111 having standardized connections to and from a corresponding INT 1111 in each adjacent tile. Therefore, INTs 1111, taken together, implement the programmable interconnect structure for the illustrated IC. Each INT 1111 also includes the connections to and from the programmable logic element within the same tile, as shown by the examples included at the right of FIG. 11.

For example, a CLB 1102 may include a configurable logic element (CLE) 1112 that may be programmed to implement user logic plus a single INT 1111. A BRAM 1103 may include a BRAM logic element (BRL) 1113 in addition to one or more INTs 1111. Typically, the number of INTs 1111 included in a tile depends on the height of the tile. As pictured, a BRAM tile has the same height as five CLBs, but other numbers (e.g., four) also may be used. A DSP tile 1106 may include a DSP logic element (DSPL) 1114 in addition to an appropriate number of INTs 1111. An 10B 1104 may include, for example, two instances of an I/O logic element (IOL) 1115 in addition to one instance of an INT 1111. The actual I/O pads connected to IOL 1115 may not be confined to the area of IOL 1115.

In the example pictured in FIG. 11, the shaded area near the center of the die, e.g., formed of regions 1105, 1107, and 1108, may be used for configuration, clock, and other control logic. Shaded areas 1109 may be used to distribute the clocks and configuration signals across the breadth of the programmable IC.

Some ICs utilizing the architecture illustrated in FIG. 11 include additional logic blocks that disrupt the regular columnar structure making up a large part of the IC. The additional logic blocks may be programmable blocks and/or dedicated circuitry. For example, a processor block depicted as PROC 1110 spans several columns of CLBs and BRAMs.

In one aspect, PROC 1110 may be implemented as dedicated circuitry, e.g., as a hardwired processor, that is fabricated as part of the die that implements the programmable circuitry of the IC. PROC 1110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1110 may be omitted from architecture 1100 and replaced with one or more of the other varieties of the programmable blocks described. Further, such blocks may be utilized to form a "soft processor" in that the various blocks of programmable circuitry may be used to form a processor that can execute program code as is the case with PROC 1110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 11 that are external to PROC 1110 such as CLBs 1102 and BRAMs 1103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1110 or a soft processor. In some cases, architecture 1100 includes a dedicated configuration processor that loads the configuration bitstream to the appropriate configuration memory and/or processor memory. The dedicated configuration processor does not execute user-specified program code. In other cases, architecture 1100 may utilize PROC 1110 to receive the configuration bitstream, load the configuration bitstream into appropriate configuration memory, and/or extract program code for execution.

FIG. 11 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 11 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1110 within the IC are for purposes of illustration only and are not intended as limitations.

An EDA system as described herein is capable of processing a circuit design having undergone the processing described herein for implementation within an IC having an architecture the same as or similar to that of FIG. 11. The EDA system, for example, is capable of synthesizing, placing, and routing the circuit design. The system may also perform bitstream generation so that the bitstream may be loaded into the IC, thereby physically implementing the circuit design within the IC.

The example of FIG. 11 is provided for purposes of illustration only. Other types of ICs with different architectures may be used. A programmable IC is an IC that includes at least some programmable circuitry. Programmable logic is a type of programmable circuitry. Examples of programmable ICs may include, but are not limited to, Field Programmable Gate Arrays (FPGAs), System-on-Chips (SoCs) having at least some programmable circuitry (e.g., programmable logic), Application-Specific ICs including at least some programmable circuitry, or other types of ICs that include programmable circuitry. A programmable IC may include one or more subsystems therein. Examples of subsystems that may be included in a programmable IC may include, but are not limited to, a data processing engine array having a plurality of hardwired and programmable data processing engines, a programmable Network-on-Chip (NoC), programmable logic, and/or a processor system having one or more processors and optionally one or more hardwired peripheral circuit blocks.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

In another aspect, a system having a processor is capable of initiating and/or performing the various operations described within this disclosure. In still another aspect, a computer program product includes one or more computer readable storage media, and program instructions collectively stored on the one or more computer readable storage media, wherein the program instructions are executable by computer hardware to initiate the various operations described within this disclosure.

What is claimed is:

1. A method, comprising:
 generating, using computer hardware, a scribe region having a plurality of contours for a static top design of a circuit design for an integrated circuit;
 wherein the static top design is configured to integrate with a user circuit design in the integrated circuit and wherein each contour defines a different size of the scribe region having a boundary that extends outward in at least one direction from a boundary of a floorplan area of the static top design on the integrated circuit;
 translating, using the computer hardware, the scribe region into a plurality of design constraints that define the plurality of contours of the scribe region and restrict placement of components of the user circuit design within the scribe region as sized according to a selected contour of the plurality of contours; and
 storing the static top design and the plurality of design constraints in a memory for use in implementing the user circuit design in the integrated circuit.

2. The method of claim 1, comprising:
 initiating an implementation of the user circuit design with the scribe region sized according to a first contour;
 in response to the implementation of the user circuit design failing, resizing the scribe region according to a second contour, wherein the second contour defines a physical region of the integrated circuit smaller in size than a physical region of the integrated circuit defined by the first contour; and
 initiating a further implementation of the user circuit design using the scribe region sized according to the second contour.

3. The method of claim 1, comprising:
 first determining, using the computer hardware, that the static top design is susceptible to a bleed-over route congestion failure.

4. The method of claim 1, comprising:
 in response to each of a plurality of unsuccessful implementation attempts of the user circuit design, selecting a contour of the scribe region used for a next implementation attempt of the user circuit design, wherein the selected contour defines a smaller physical region of the integrated circuit than was used for each prior failed implementation attempt of the user circuit design.

5. The method of claim 1, wherein the plurality of contours of the scribe region are generated through geometric boundary expansion of the floorplan area of the static top design in one or more directions.

6. The method of claim 1, wherein the plurality of contours of the scribe region are generated based on proximity of placed primitives of the static top design to the boundary of the floorplan area of the static top design.

7. The method of claim 1, wherein the plurality of contours of the scribe region are generated based on routing resources used by the static top design that extend outside of the boundary of the floorplan area of the static top design.

8. The method of claim 1, wherein the plurality of contours of the scribe region are generated based on wire density of primitives of the static top design placed within a predetermined distance of the boundary of the floorplan area of the static top design.

9. The method of claim 1, wherein the plurality of contours of the scribe region are generated based on wire density of primitives of the user circuit design placed within a predetermined distance of the boundary of the floorplan area of the static top design.

10. A system, comprising:
 one or more processors configured to initiate executable operations including:
  generating a scribe region having a plurality of contours for a static top design of a circuit design for an integrated circuit;
  wherein the static top design is configured to integrate with a user circuit design in the integrated circuit and wherein each contour defines a different size of the scribe region having a boundary that extends outward in at least one direction from a boundary of a floorplan area of the static top design on the integrated circuit;
  translating the scribe region into a plurality of design constraints that define the plurality of contours of the scribe region and restrict placement of components of the user circuit design within the scribe region as sized according to a selected contour of the plurality of contours; and
  storing the static top design and the plurality of design constraints in a memory for use in implementing the user circuit design in the integrated circuit.

11. The system of claim 10, wherein the processor is configured to initiate operations comprising:
 initiating an implementation of the user circuit design with the scribe region sized according to a first contour;
 in response to the implementation of the user circuit design failing, resizing the scribe region according to a second contour, wherein the second contour defines a physical region of the integrated circuit smaller in size than a physical region of the integrated circuit defined by the first contour; and
 initiating a further implementation of the user circuit design using the scribe region sized according to the second contour.

12. The system of claim 10, wherein the processor is configured to initiate operations comprising:
 first determining that the static top design is susceptible to a bleed-over route congestion failure.

13. The system of claim 10, wherein the processor is configured to initiate operations comprising:
 in response to each of a plurality of unsuccessful implementation attempts of the user circuit design, selecting a contour of the scribe region used for a next implementation attempt of the user circuit design, wherein the selected contour defines a smaller physical region of the integrated circuit than was used for each prior failed implementation attempt of the user circuit design.

14. The system of claim 10, wherein the plurality of contours of the scribe region are generated through geometric boundary expansion of the floorplan area of the static top design in one or more directions.

15. The system of claim 10, wherein the plurality of contours of the scribe region are generated based on proximity of placed primitives of the static top design to the boundary of the floorplan area of the static top design.

16. The system of claim 10, wherein the plurality of contours of the scribe region are generated based on routing resources used by the static top design that extend outside of the boundary of the floorplan area of the static top design.

17. The system of claim 10, wherein the plurality of contours of the scribe region are generated based on wire density of primitives of the static top design placed within a predetermined distance of the boundary of the floorplan area of the static top design.

18. The system of claim 10, wherein the plurality of contours of the scribe region are generated based on wire density of primitives of the user circuit design placed within a predetermined distance of the boundary of the floorplan area of the static top design.

19. A computer program product, comprising:
one or more computer readable storage media, and program instructions collectively stored on the one or more computer readable storage media, wherein the program instructions are executable by computer hardware to initiate operations including:
generating a scribe region having a plurality of contours for a static top design of a circuit design for an integrated circuit;
wherein the static top design is configured to integrate with a user circuit design in the integrated circuit and wherein each contour defines a different size of the scribe region having a boundary that extends outward in at least one direction from a boundary of a floorplan area of the static top design on the integrated circuit;
translating the scribe region into a plurality of design constraints that define the plurality of contours of the scribe region and restrict placement of components of the user circuit design within the scribe region as sized according to a selected contour of the plurality of contours; and
storing the static top design and the plurality of design constraints in a memory for use in implementing the user circuit design in the integrated circuit.

20. The computer program product of claim 19, wherein the program instructions are executable by computer hardware to initiate operations including:
initiating an implementation of the user circuit design with the scribe region sized according to a first contour;
in response to the implementation of the user circuit design failing, resizing the scribe region according to a second contour, wherein the second contour defines a physical region of the integrated circuit smaller in size than a physical region of the integrated circuit defined by the first contour; and
initiating a further implementation of the user circuit design using the scribe region sized according to the second contour.

* * * * *